United States Patent
Schwarz et al.

(10) Patent No.: US 11,999,124 B2
(45) Date of Patent: Jun. 4, 2024

(54) APPARATUS AND METHOD FOR SEPARATING SUBSTANCES WITH DIFFERENT FLOWABILITY

(71) Applicant: Nordischer Maschinenbau Rud. Baader GmbH + Co. KG, Lübeck (DE)

(72) Inventors: Olaf Schwarz, Lübeck (DE); Friedemann Hanf, Lübeck (DE); Uwe Karsten, Lübeck (DE); Joachim Härtlein, Lübeck (DE); Michael Fuchs, Lübeck (DE); Henrik Arndt, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 251 days.

(21) Appl. No.: 17/530,713

(22) Filed: Nov. 19, 2021

(65) Prior Publication Data
US 2022/0152965 A1 May 19, 2022

(30) Foreign Application Priority Data
Nov. 19, 2020 (EP) ................................ 20208619

(51) Int. Cl.
*B30B 9/24* (2006.01)
*A22C 17/04* (2006.01)

(52) U.S. Cl.
CPC ............ *B30B 9/241* (2013.01); *B30B 9/246* (2013.01); *A22C 17/04* (2013.01)

(58) Field of Classification Search
CPC .......... B30B 9/241; B30B 9/247; A22C 17/04
See application file for complete search history.

(56) References Cited

U.S. PATENT DOCUMENTS

| | | |
|---|---|---|
| 4,232,051 A | 11/1980 | Hinds, Jr. et al. |
| 5,894,791 A | 4/1999 | Rose et al. |
| (Continued) | | |

FOREIGN PATENT DOCUMENTS

| | | | | |
|---|---|---|---|---|
| CN | 102986820 A | | 3/2013 | |
| CN | 204584790 U | * | 8/2015 | ............... B23Q 3/06 |
| (Continued) | | | | |

OTHER PUBLICATIONS

English translation of DE 10 2018 101 985 B3, 10 pages, retrieved in Aug. 2023 (Year: 2023).*

(Continued)

*Primary Examiner* — Jimmy T Nguyen
(74) *Attorney, Agent, or Firm* — DINSMORE & SHOHL LLP

(57) ABSTRACT

An apparatus for separating substances of different flowability includes a housing base, a hollow drum having a perforated peripheral surface which is arranged on the housing base and is driven in a revolving manner, a continuous press belt pressed from outside against the hollow drum, while wrapping around a portion of the circumference of the hollow drum, and which, together with the hollow drum, forms an intake wedge for the material to be pressed. The press belt is mounted by at least one drive roller and at least one bearing roller, and is distinguished by the fact that the drive roller is mounted on a bearing support. The bearing support is arranged on the housing base so as to be adjustable in terms of position. A corresponding method is also provided for adapting the apparatus.

20 Claims, 4 Drawing Sheets

(56) References Cited

U.S. PATENT DOCUMENTS 9,089,876 B2 * 7/2015 Hoppe .................. B30B 15/34
2021/0037837 A1 2/2021 Günther

FOREIGN PATENT DOCUMENTS

| | | |
|---|---|---|
| DE | 29518810 U1 | 1/1996 |
| DE | 102018101985 B3 | 9/2018 |
| DE | 102018131533 B3 | 3/2020 |
| DE | 102019116720 B3 | 6/2020 |
| GB | 201190 A | 7/1923 |
| JP | S60166491 U | 11/1985 |
| WO | 87/06330 A1 | 10/1987 |

OTHER PUBLICATIONS

English translation of CN 102986820 A, 16 pages, retrieved in Aug. 2023 (Year: 2023).*
English translation of CN 107498916 A, 3 pages, retrieved in Sep. 2023 (Year: 2023).*

* cited by examiner

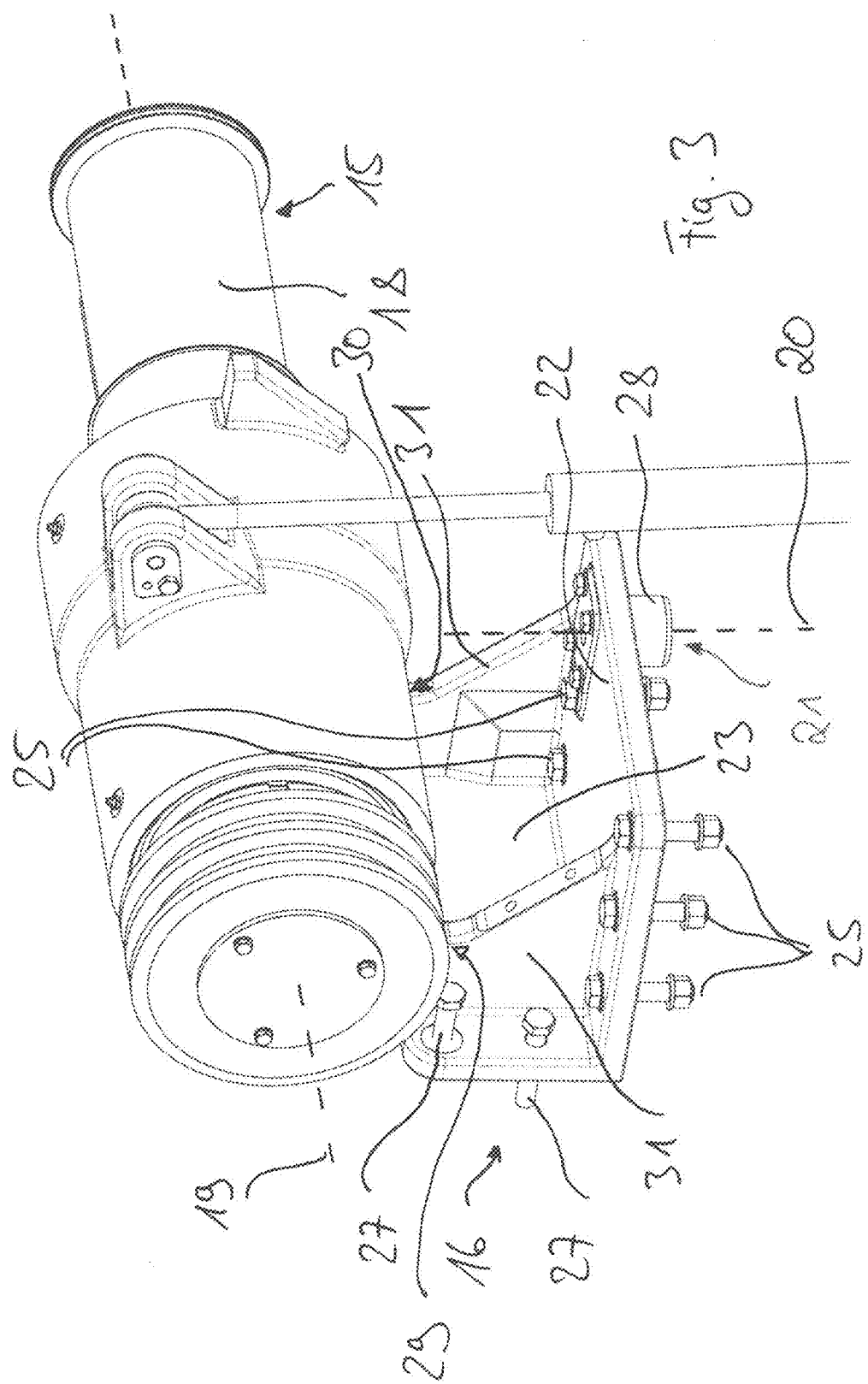

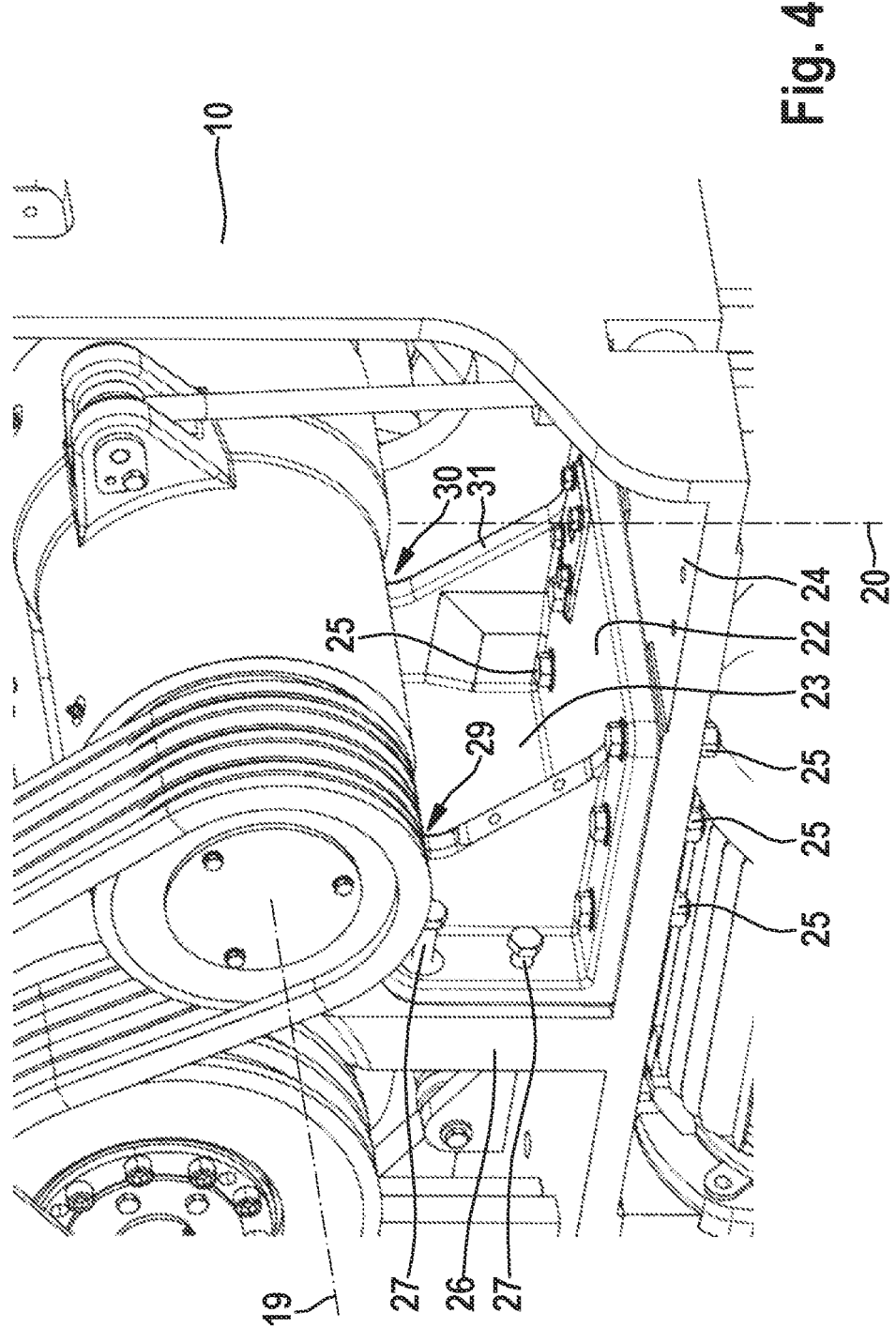

APPARATUS AND METHOD FOR SEPARATING SUBSTANCES WITH DIFFERENT FLOWABILITY

CROSS-REFERENCE TO RELATED APPLICATION

This application claims priority to European application number 20208619.5 filed Nov. 19, 2020, the disclosure of which is hereby incorporated by reference in its entirety.

FIELD OF THE INVENTION

The present invention relates to an apparatus for separating substances of different flowability, comprising a housing base, a hollow drum having a perforated peripheral surface which is arranged on the housing base and is driven in a revolving manner, a continuous press belt which can be pressed from outside against the hollow drum, while wrapping around a portion of the circumference of the hollow drum, and which, together with the hollow drum, forms an intake wedge for the material to be pressed, wherein the press belt is mounted by means of at least one drive roller and at least one bearing roller.

The invention relates further to a method for adapting the above-mentioned apparatus for the separation of substances of different flowability.

BACKGROUND OF THE INVENTION

Such apparatuses and methods are used in various sectors of industry. Materials which exhibit different flow behaviors are in principle separable. Such apparatuses and methods are used, for example, in the processing of animal bodies in order to separate skin, flesh and/or sinew components from bone. They are also used in separating the pulp from the skin, stems, kernels or stones of vegetables or fruits. A further field of use is in the separation of in particular composite packaging, for example of cardboard drinks packaging, which consists of cartons coated with plastics film and/or aluminum foil.

SUMMARY OF THE INVENTION

The devices for separating substances of different flowability, which are also referred to as pressing/separating machines or soft separators, generally comprise a hollow drum provided with a perforated peripheral surface, and a press belt which is operatively connected to the hollow drum in a partial circumferential region. The press belt and the hollow drum are both driven. The material to be pressed and separated enters an intake region between the resilient press belt and the perforated hollow drum. In this intake region, the press belt, together with the hollow drum, forms an intake wedge for the material to be pressed.

Owing to different flowabilities of the partial constituents of the material to be pressed, constituents that are more flowable are pressed through the perforated peripheral surface of the hollow drum from the outside to the inside.

During the intake of the material to be pressed and during the separation of the substances of different flowability, high forces generally act. During operation, the gap present between the circumferential surface of the hollow drum and the circumferential surface of the drive roller/press roller has a smaller gap width in the vicinity of the housing base than is the case in regions of the gap that are further away from the housing base. This has the result that more product is taken in in regions of the gap with a larger width than is the case in regions of the gap with a smaller width. On the one hand, this adversely affects the quality of the separated material, and on the other hand it makes it more difficult to optionally adapt the gap width to the requirements of the separating process in question. Material to be pressed that is located in regions with a larger gap width generally does not pass through the holes in the hollow drum and therefore does not take part in the actual separating process.

Accordingly, it is an object of the present invention to propose an apparatus which allows the gap width to be set precisely and easily, and in particular allows the peripheral surfaces of the drive roller/press roller and the hollow drum to be oriented as parallel as possible. The object consists further in proposing a method for adapting such an apparatus.

The object is achieved by an apparatus having the features mentioned hereinbefore in that the drive roller is mounted on a bearing support and the bearing support is arranged on the housing base so as to be adjustable in terms of position. This offers the advantage that the drive roller absorbs the holding forces that occur via the bearing support and transmits them to the housing base. In this manner, the drive roller is securely mounted so that, regardless of the forces that occur, the gap width remains constant once it has been set. A further advantage is that the bearing support is adapted so as to be adjustable in terms of position.

Prior to operation of the apparatus according to the invention it is thus possible optimally to set the desired gap size and the orientation of the drive roller relative to the hollow drum. In particular, it is thus possible to preset the gap size to be constant over the entire gap and thus ensure that the peripheral surfaces of the drive roller and the hollow drum are always oriented as parallel as possible.

An expedient configuration of the invention is characterized in that the bearing support, for adjustment of its position, is adapted to be pivotable relative to the housing base about a pivot axis, oriented at least substantially perpendicularly to a longitudinal axis of the drive roller, of a pivot bearing. The pivot bearing according to the invention has an advantageous effect on the operation of setting and orienting the drive roller. The orientation of the drive roller and the gap size can thus be set particularly conveniently by simply pivoting the bearing support about the mentioned longitudinal axis.

The pivot bearing according to the invention additionally has the advantage that, on pivoting of the drive roller, the gap size on the housing base side is subject to a smaller gap size change than the respective gap size on the side remote from the housing base. In this manner, by means of a simple pivot movement, the larger gap size which is generally present on the side of the gap that is remote from the housing can be set to a uniform size relative to the generally smaller gap size on the housing base side.

A preferred further development of the invention is distinguished by the fact that the bearing support is in the form of an angular element and comprises a bearing support base and at least one bearing support side surface. The bearing support is thus preferably L-shaped, wherein the bearing support base is arranged at a right angle relative to the bearing support side surface, which forms a side part of the bearing support.

According to a further preferred configuration of the invention, the bearing support base is arranged so that it lies on a horizontally extending support base of the housing base. The own weight of the drive roller, and also forces acting on the drive roller in the direction of the support base, are thus advantageously conducted via the bearing support base to the support base of the housing base. This support is always ensured also during the setting and orientation operation, so that positioning of the bearing support can be carried out as simply as possible.

According to a further preferred embodiment, the apparatus further comprises at least one locking means which is configured to releasably fix the bearing support to the housing base in a locking position. In this manner it is ensured that the bearing support is securely fixed to the housing base in the locking position, so that the position of the bearing support, once it has been set, is always maintained even under the action of a high force. By releasing the at least one locking means, the bearing support is freed from the housing base inasmuch as its position is adjustable. Once the desired bearing support position has been set, the bearing support is securely fixed to the housing base again by means of the at least one locking means. The support base of the housing base and the bearing support base preferably form mutually facing clamping surfaces between which, in the locking position, the clamping force required to fix the bearing support in position is applied by the at least one locking means.

A further expedient configuration of the invention is characterized in that the bearing support base has an elongated hole-like passage opening for each of the locking means. It is thus advantageously possible to adjust the position of the bearing support without detaching the bearing support from the housing base completely. The elongated holes are shaped according to the required positioning path in each case, or have a corresponding oversize relative to the at least one locking means, so that the locking means, in the released position, are able to move freely in the elongated holes during the adjustment of the position of the bearing support.

A preferred further development of the invention is distinguished by the fact that the housing base comprises at least one vertically extending support wall which forms a counter-support for at least one adjusting means which is arranged between the support wall and the at least one bearing support side surface and is adapted for adjusting the position of the bearing support relative to the housing base. In other words, the bearing support is designed so that it is supported relative to this support wall. The adjustment of the position can in this manner always be carried out with the greatest precision—while high forces are at the same time acting on the bearing support. The adjusting means can be in purely mechanical form, for example in the form of threaded screws, or can be adapted to be electromechanically, pneumatically and/or hydraulically controllable.

A further expedient configuration of the invention is characterized in that the pivot bearing is formed by a recess in a bottom part of the housing base and a protrusion of the bearing support which engages in a positive-locking manner into this recess. The recess is thus preferably an integral part of the housing base and is simple to produce from the point of view of manufacturing. Owing to the structurally comparatively simple construction of the pivot bearing, it is particularly robust and virtually maintenance-free. Moreover, the pivot bearing according to the invention is configured to absorb the forces that occur and to support the bearing support relative to the housing base.

According to a further preferred configuration of the invention, the bearing support is adapted to mount the drive roller by means of at least two mutually spaced apart axle bearings. The two mutually spaced apart axle bearings offer the advantage of precise mounting of the drive roller and in particular counteract the high forces acting on the drive roller. In this manner, both the gap size and the orientation of the drive roller are always ensured under all operating conditions.

A further expedient configuration of the invention is characterized in that at least one transverse stiffening element is arranged between the bearing support base and the bearing support side surface. The inherent stiffness of the bearing support is thus increased, and warping of the bearing support which is otherwise possible under the action of high holding forces is counteracted. Deviations from the set bearing support position which would otherwise be possible under the action of a changing force are thus reliably prevented.

The object is further achieved by a corresponding method having the features mentioned hereinbefore, which method is distinguished by at least substantially parallel orientation of the drive roller relative to the peripheral surface of the hollow drum by adjustment of the position of a bearing support, on which the drive roller is mounted, relative to the housing base. The advantages associated with the apparatus according to the invention apply in the same manner to the method according to the invention. In order to avoid repetition, reference is therefore made to the above-mentioned advantages of the apparatus according to the invention, and only some selected aspects of the method according to the invention will additionally be discussed in greater detail hereinbelow.

A further expedient configuration of the invention is characterized in that the bearing support, for adjustment of its position, is pivoted relative to the housing base about a pivot axis, oriented at least substantially perpendicularly to a longitudinal axis of the drive roller, of a pivot bearing.

A further expedient configuration of the invention is characterized in that the bearing support is in the form of an angular element and comprises a bearing support base and at least one bearing support side surface, and the bearing support base lies on a horizontally extending support base of the housing base.

A preferred further development of the invention is distinguished by releasable fixing of the bearing support to the housing base in a locking position by means of locking means.

A further expedient configuration of the invention is characterized in that the adjustment of the position takes place by means of at least one adjusting means which is arranged between at least one vertically extending support wall, forming a counter-support, of the housing base and the at least one bearing support side surface of the bearing support.

BRIEF DESCRIPTION OF THE DRAWINGS

Further preferred and/or expedient features and configurations of the invention will become apparent from the dependent claims and the description. Particularly preferred embodiments will be explained in greater detail with reference to the accompanying drawing. In the drawing:

FIG. 3 is a perspective detail view of the drive roller with the bearing support, and FIG. 4 is an enlarged detail of the rear view shown in FIG. 2.

DETAILED DESCRIPTION OF THE INVENTION

Figure 1:
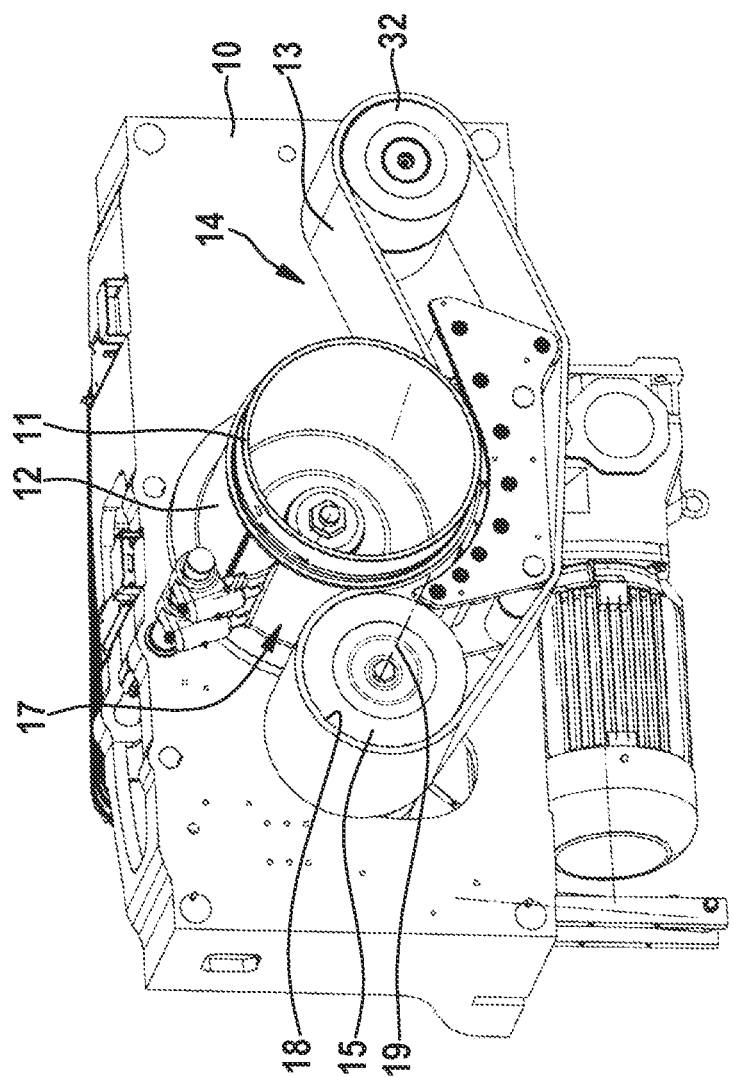
FIG. 1 is a perspective front view of the apparatus according to the invention.

FIG. 1 is a perspective front view of the apparatus according to the invention for separating substances of different flowability. The apparatus comprises a housing base 10. As is shown in FIG. 1, the housing base 10 forms a base frame on which all the machine components are arranged. A hollow drum 11 which is driven in a revolving manner is arranged on the housing base 10. The hollow drum 11 itself has a perforated peripheral surface 12. This perforation is not shown in the drawing for reasons of clarity.

The apparatus according to the invention further comprises a continuous press belt 13. The press belt 13 is configured to be pressed from outside against the hollow drum 11 while wrapping around a portion of the circumference of the hollow drum 11. The hollow drum 11 and the press belt 13 thus form an intake wedge 14 for the material to be pressed—not shown in the drawing.

As is shown in the drawing, the press belt 13 is mounted by means of at least one drive roller 15 and at least one bearing roller 32. By means of the mentioned rollers 15, 32, the press belt 13 is pressed in a pretensioned manner against the hollow drum 11.

Figure 2:
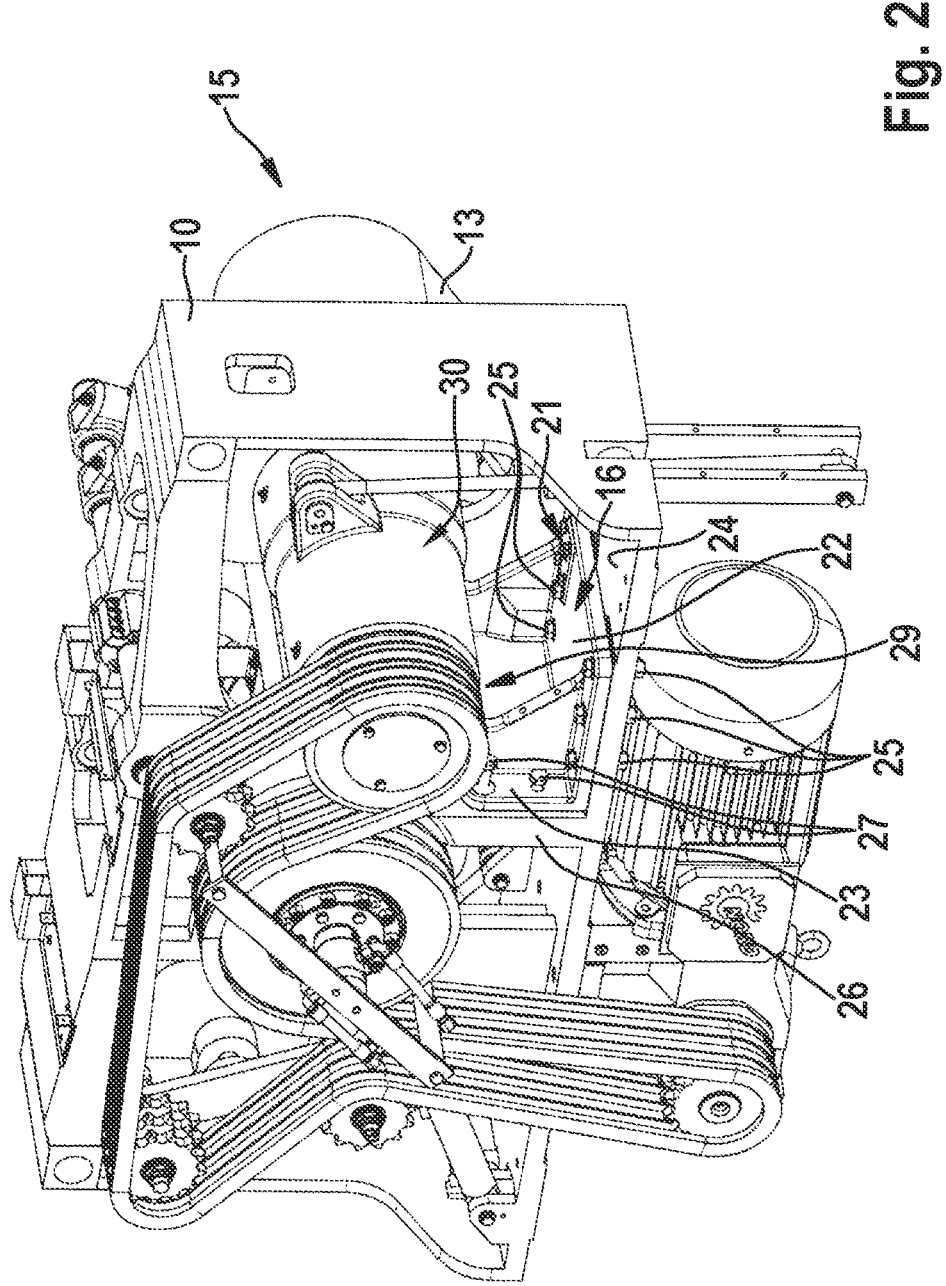
FIG. 2 is a perspective rear view of the apparatus according to the invention.

As is shown in FIGS. 2 to 4, the drive roller 15 is mounted on a bearing support 16. The bearing support 16 itself is arranged on the housing base 10 so as to be adjustable in terms of position. By changing the position of the bearing support 16, the position of the drive roller 15 can also be changed, so that it can be oriented optimally.

In order to obtain separated material of the highest possible quality, it is necessary that the width of the gap 17 (see FIG. 1) formed between the hollow drum 11 and the drive roller 15 is as constant as possible over the entire width of the press belt 13. In other words, an optimal result is achieved in the separating process when the distance between the peripheral surface 12 of the hollow drum 11 relative to the peripheral surface 18 of the drive roller is constant over the entire width of the gap 17.

Owing to the adjustability of the position of the bearing support 16, it is possible to orient the drive roller 15 optimally with regard to as constant a gap width as possible. In addition, the gap width overall can be varied and adapted to different operating conditions.

For adjustment of its position, the bearing support 16 is preferably adapted so as to be pivotable relative to the housing base 10 about a pivot axis 20—visible in FIG. 3—of a pivot bearing 21, which pivot axis is oriented perpendicularly to a longitudinal axis 19 of the drive roller 15. The pivot axis 20 is optionally not oriented exactly at a 90° angle relative to the longitudinal axis 19 but instead can be arranged at an angle that differs slightly therefrom, for example by +/−10°, so that it is oriented only substantially perpendicularly to the longitudinal axis 19 of the drive roller 15.

The bearing support 16 is further preferably in the form of an angular element and comprises a bearing support base 22 and at least one bearing support side surface 23, which forms a side part standing perpendicularly on the bearing support base 22. As is shown in FIG. 2, the bearing support base 22 is arranged lying on a horizontally extending support base 24 of the housing base 10.

The apparatus according to the invention preferably comprises at least one locking means 25, which is configured to releasably fix the bearing support 16 to the housing base 10 in a locking position. There are used as the locking means 25, for example, the threaded bolts shown in the drawing. Between four and eight threaded bolts are preferably used. By releasing the locking means 25, the position of the bearing support 16 can be changed by pivoting about the pivot axis 20. Once the desired new position of the bearing support 16 has been set, the position of the bearing support 16 is fixed by means of the locking means 25. This is carried out, for example, by tightening the threaded bolts so that a clamping connection between the bearing support base 22 and the support base 24 of the housing base 10 is formed.

The bearing support base 22 preferably has an elongated hole-like passage opening—not shown in the drawing—for each of the locking means 25. The passage openings are in particular so chosen that the locking means 25 are guided through them with appropriate play, so that, in the unlocked state, the locking means 25 are able to move freely inside the elongated holes to a certain extent.

Further preferably, the housing base 10 comprises at least one vertically extending support wall 26. The support wall 26 forms a counter-support for at least one adjusting means 27 which is arranged between the support wall 26 and the at least one bearing support side surface 23 and is adapted for adjusting the position of the bearing support 16 relative to the housing base 10. The adjusting means 27 is or are preferably formed by threaded bolts which are guided via a thread through the bearing support side surface. The threaded bolts thus form adjusting screws by means of which the position of the bearing support 16 is precisely adjustable in the unlocked state by support relative to the support wall 26 of the housing base 10.

The pivot bearing 21 is advantageously formed by a recess—not shown in the drawing—in a bottom part of the housing base 10, in particular in the support base 24, and a protrusion 28 of the bearing support 16 which engages in a positive-locking manner into the recess. The recess is preferably so formed that it receives the protrusion 28 in a positive-locking manner and thus forms a sliding bearing. The protrusion 28 is further preferably in the form of a cylindrical pin element with a circular cross section. Accordingly, the recess preferably likewise has a circular cross section, the diameter of which is chosen to be slightly larger than the outside diameter of the pin element.

Advantageously, the bearing support 16 is further adapted to mount the drive roller 15 by means of at least two mutually spaced apart axle bearings 29, 30. As is shown in FIGS. 2 to 4, the axle bearings 29, 30 are spaced apart from one another in the axial direction of the drive roller 15. For stiffening the bearing support 16, at least one transverse stiffening element 31 is arranged between the bearing support base 22 and the bearing support side surface 23.

The present invention also includes the method mentioned hereinbefore for adapting the apparatus described above for the separation of substances of different flowability. For adapting the apparatus prior to operation thereof, the width of the gap 17 between the hollow drum 11 and the drive roller 15, for example, is first chosen according to the particular properties of the material for pressing that is to be processed. In particular, the drive roller 15 is then oriented relative to the peripheral surface 12 of the hollow drum 11 by adjusting the position of the bearing support 16, on which the drive roller 15 is mounted, relative to the housing base 10.

The orientation is carried out preferably at least substantially parallel to one another, that is to say the drive roller 15 is oriented either parallel to the peripheral surface 12 of the hollow drum 11 or deviating only slightly therefrom, for example with a maximum deviation from a parallel orientation of +/−10 degrees.

For adjustment of its position, the bearing support 16 is preferably pivoted relative to the housing base 10 about a pivot axis, oriented at least substantially perpendicularly to the longitudinal axis 19 of the drive roller 15, of the pivot bearing 21. It is further advantageous if the bearing support 16 in the form of an angular element, which comprises the bearing support base 22 and the at least one bearing support side surface 23, thereby lies with its bearing support base 22 on the horizontally extending support base 24 of the housing base 10.

According to an advantageous variant of the method according to the invention, the releasable fixing of the bearing support 16 to the housing base 10 in a locking position is carried out by means of the locking means 25 described hereinbefore.

The adjustment of the position preferably takes place by means of the at least one adjusting means 27 which is arranged between the at least one vertically extending support wall 26 of the housing, or of the housing base 10, which forms the above-described counter-support, and the at least one bearing support side surface 23 of the bearing support 16. In the drawing, the adjusting means 27 are shown in a possible form as threaded screws. In addition to such purely mechanical adjustment, it is also possible that the adjusting means are in the form of electromotive, pneumatic or hydraulic adjusting elements, so that the adjustment of the position of the bearing support 16 is controllable.

The invention claimed is:

1. An apparatus for separating substances of different flowability, comprising:
    a housing base;
    a hollow drum having a perforated peripheral surface which is arranged on the housing base and is driven in a revolving manner;
    a continuous press belt pressed from outside against the hollow drum, while wrapping around a portion of the circumference of the hollow drum, and which, together with the hollow drum, forms an intake wedge for the material to be pressed;
    wherein the press belt is mounted by at least one drive roller and at least one bearing roller;
    wherein the drive roller is mounted on a bearing support, and the bearing support is arranged on the housing base so as to be adjustable in terms of position; and
    wherein the bearing support, for adjustment of its position, is adapted to be pivotable relative to the housing base about a pivot axis of a pivot bearing, the pivot axis oriented at least substantially perpendicularly to a longitudinal axis of the drive roller.

2. The apparatus of claim 1, wherein the bearing support is in the form of an angular element and comprises a bearing support base and at least one bearing support side surface.

3. The apparatus of claim 2, wherein the bearing support base is arranged so that it lies on a horizontally extending support base of the housing base.

4. The apparatus of claim 1, further comprising at least one locking element which is configured to releasably fix the bearing support to the housing base in a locking position.

5. The apparatus of claim 4, wherein the bearing support comprises a bearing support base having an elongated hole-like passage opening for the at least one locking element.

6. The apparatus of claim 2, wherein the housing base comprises at least one vertically extending support wall which forms a counter-support for at least one adjusting element which is arranged between the support wall and the at least one bearing support side surface and is adapted for adjusting the position of the bearing support relative to the housing base.

7. The apparatus of claim 2, wherein the pivot bearing is formed by a recess in a bottom part of the housing base and a protrusion of the bearing support which engages in a positive-locking manner into this recess.

8. The apparatus of claim 1, wherein the bearing support is adapted to mount the drive roller by at least two mutually spaced apart axle bearings.

9. The apparatus of claim 2, wherein at least one transverse stiffening element is arranged between the bearing support base and the bearing support side surface.

10. A method for adapting an apparatus for separation of substances of different flowability, wherein the apparatus comprises a housing base, a hollow drum having a perforated peripheral surface which is arranged on the housing base and is driven in a revolving manner, a continuous press belt pressed from outside against the hollow drum, while wrapping around a portion of the circumference of the hollow drum, and which, together with the hollow drum, forms an intake wedge for the material to be pressed, and wherein the press belt is mounted by at least one drive roller and at least one bearing roller, wherein the method comprises:
    orienting the drive roller at least substantially parallel relative to the peripheral surface of the hollow drum by adjustment of a position of a bearing support, on which the drive roller is mounted, relative to the housing base;
    wherein the bearing support, for adjustment of its position, is pivoted relative to the housing base about a pivot axis of a pivot bearing, the pivot axis oriented at least substantially perpendicularly to a longitudinal axis of the drive roller.

11. The method of claim 10, wherein the bearing support is in the form of an angular element and comprises a bearing support base and at least one bearing support side surface, and the bearing support base lies on a horizontally extending support base of the housing base.

12. The method of claim 10, wherein the bearing support is releasably fixed to the housing base in a locking position by a locking element.

13. The method of claim 10, wherein the adjustment of the position takes place by at least one adjusting element which is arranged between at least one vertically extending support wall, forming a counter-support, of the housing base and the at least one bearing support side surface of the bearing support.

14. An apparatus for separating substances of different flowability, comprising:
    a housing base;
    a hollow drum having a perforated peripheral surface which is arranged on the housing base and is driven in a revolving manner;
    a continuous press belt pressed from outside against the hollow drum, while wrapping around a portion of the circumference of the hollow drum, and which, together with the hollow drum, forms an intake wedge for the material to be pressed;

wherein the press belt is mounted by at least one drive roller and at least one bearing roller;

wherein the drive roller is mounted on a bearing support, and the bearing support is arranged on the housing base so as to be adjustable in terms of position;

wherein the bearing support is in the form of an angular element and comprises a bearing support base and at least one bearing support side surface; and wherein the pivot bearing is formed by a recess in a bottom part of the housing base and a protrusion of the bearing support which engages in a positive-locking manner into this recess.

15. The apparatus of claim 14, wherein the bearing support base is arranged so that it lies on a horizontally extending support base of the housing base.

16. The apparatus of claim 14, further comprising at least one locking element which is configured to releasably fix the bearing support to the housing base in a locking position.

17. The apparatus of claim 16, wherein the bearing support base has an elongated hole-like passage opening for the at least one locking element.

18. The apparatus of claim 14, wherein the housing base comprises at least one vertically extending support wall which forms a counter-support for at least one adjusting element which is arranged between the support wall and the at least one bearing support side surface and is adapted for adjusting the position of the bearing support relative to the housing base.

19. The apparatus of claim 14, wherein the bearing support is adapted to mount the drive roller by at least two mutually spaced apart axle bearings.

20. The apparatus of claim 14, wherein at least one transverse stiffening element is arranged between the bearing support base and the bearing support side surface.

* * * * *